United States Patent
Shonts et al.

(10) Patent No.: US 9,472,870 B2
(45) Date of Patent: Oct. 18, 2016

(54) BATTERY SENSOR CLAMP ASSEMBLY

(71) Applicant: CONTINENTAL AUTOMOTIVE SYSTEMS, INC., Auburn Hills, MI (US)

(72) Inventors: Eric G Shonts, Lake Ontario, MI (US); John Bruce Horst, Sterling Heights, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/700,653

(22) Filed: Apr. 30, 2015

(65) Prior Publication Data

US 2015/0325935 A1    Nov. 12, 2015

Related U.S. Application Data

(60) Provisional application No. 61/989,082, filed on May 6, 2014.

(51) Int. Cl.
| | | |
|---|---|---|
| *H01R 11/26* | (2006.01) | |
| *H01R 11/28* | (2006.01) | |
| *F16B 2/06* | (2006.01) | |
| *F16B 2/14* | (2006.01) | |

(52) U.S. Cl.
CPC ............. *H01R 11/283* (2013.01); *F16B 2/065* (2013.01); *F16B 2/14* (2013.01); *H01R 11/289* (2013.01)

(58) Field of Classification Search
CPC .................................................. H01R 11/283
USPC ........................................ 439/770, 762, 774
See application file for complete search history.

(56) References Cited

U.S. PATENT DOCUMENTS

| 1,746,514 A | * | 2/1930 | Baunach | H01R 11/283 439/762 |
|---|---|---|---|---|
| 3,568,138 A | * | 3/1971 | Bakker | H01R 11/281 439/762 |
| 5,302,142 A | * | 4/1994 | Tabata | H01R 11/283 439/762 |
| 5,302,143 A | * | 4/1994 | Inoue | H01R 11/283 439/762 |
| 5,547,403 A | * | 8/1996 | Haberstroh | H01R 11/283 439/762 |

(Continued)

FOREIGN PATENT DOCUMENTS

| EP | 2434583 A1 | 3/2012 |
|---|---|---|
| JP | H1064611 A | 3/1998 |

(Continued)

OTHER PUBLICATIONS

European Search Report dated Oct. 6, 2015.

*Primary Examiner* — Neil Abrams

(57) ABSTRACT

A clamp assembly for securing a battery sensor to a vehicle battery comprises a surround portion defining an aperture for at least partially surrounding a battery post for the vehicle battery and a pair of clamping arms extending from opposing ends of the surround portion. A tab extends from one of the clamp arms toward the other of the clamp arms, wherein the tab defines a first through hole. A wedge has a generally U-shaped cross-section, where a width of the base of the wedge is less than a width at distal ends of the U-shaped cross-section and the base of the wedge defines a second through hole. The wedge is fitted over the clamping arms and a fastener is threaded through the first and the second through holes. A nut is threaded on the fastener to force the wedge over the clamp arms such that the width at the base of the wedge forces the clamp arms toward one another.

16 Claims, 4 Drawing Sheets

(56) References Cited

U.S. PATENT DOCUMENTS

| | | | | |
|---|---|---|---|---|
| 5,558,544 A | * | 9/1996 | Okada | H01R 11/282 |
| | | | | 439/762 |
| 6,817,908 B2 | | 11/2004 | Freitag | |
| 7,458,861 B1 | * | 12/2008 | Eke | H01R 4/64 |
| | | | | 439/798 |
| 8,287,319 B2 | * | 10/2012 | Falchetti | H01R 11/283 |
| | | | | 439/765 |
| 9,263,810 B2 | * | 2/2016 | Noh | H01R 11/283 |
| 2012/0196492 A1 | * | 8/2012 | Facco | H01R 11/283 |
| | | | | 439/765 |
| 2013/0200903 A1 | * | 8/2013 | Labbe | G01R 31/3606 |
| | | | | 324/437 |
| 2015/0325935 A1 | * | 11/2015 | Shonts | H01R 11/289 |
| | | | | 439/762 |

FOREIGN PATENT DOCUMENTS

| | | |
|---|---|---|
| JP | H1126054 A | 1/1999 |
| JP | 2000082455 A | 3/2000 |
| JP | 2002184387 A | 6/2002 |
| WO | 2011036551 A1 | 3/2011 |

* cited by examiner

BATTERY SENSOR CLAMP ASSEMBLY

CROSS-REFERENCE TO RELATED APPLICATIONS

This disclosure claims priority to U.S. Provisional Application No. 61/989,082, which was filed on May 6, 2014, which is incorporated herein by reference.

TECHNICAL FIELD

The present disclosure relates to automotive vehicles, and more particularly to battery sensors for automotive vehicles.

BACKGROUND

Conventional batteries for automotive vehicles are 12 volt lead acid batteries, which have standard connection poles for negative and positive connection of the battery to the vehicle. Battery sensors can be used to provide important information about the battery characteristics, including current, state of charge, performance, batter aging, etc. The battery sensors can also be used to provide information on whether the battery is able to support automatic engine start-stop systems.

The battery sensor is typically clamped to the negative pole proximate to the battery. The clamp commonly includes arms extending from a housing for the sensor to at least partially surround the negative pole. A horizontally oriented fastener is positioned at the distal ends of the arms to draw the arms of the clamp toward one another. The horizontally oriented fastener is tightened around the negative pole such that the arms to provide a clamping force.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A clamp assembly for securing a battery sensor to a vehicle battery comprises a surround portion defining an aperture for at least partially surrounding a battery post for the vehicle battery and a pair of clamping arms extending from opposing ends of the surround portion. A tab extends from one of the clamp arms toward the other of the clamp arms, wherein the tab defines a first through hole. A wedge has a generally U-shaped cross-section, where a width of the base of the wedge is less than a width at distal ends of the U-shaped cross-section and the base of the wedge defines a second through hole. The wedge is fitted over the clamping arms and a fastener is threaded through the first and the second through holes. A nut is threaded on the fastener to force the wedge over the clamp arms such that the width at the base of the wedge forces the clamp arms toward one another.

A method for assembling a battery sensor clamp comprises providing a surround portion having a pair of clamping arms extending in generally the same direction as one another from opposing ends of the surround portion and a tab extending from one of the clamp arms toward the other of the clamp arms. The tab defines a first through hole and a fastener is threaded through the first through hole. A wedge having a generally U-shaped cross-section is fitted over the clamp arms, wherein a width of the base of the wedge is less than a width at distal ends of the U-shaped cross-section. The base of the wedge defines a second through hole and the fastener is threaded through the second through hole. A nut is threaded on the fastener to retain the wedge to the clamp arms.

The surround portion defines an aperture for at least partially surrounding a battery post for the vehicle battery is placed on the battery post and the nut is tightened on the fastener to force the wedge over the clamp arms such that the width at the base of the wedge forces the clamp arms toward one another and decreasing the size of the aperture to apply a clamping force around the battery post.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
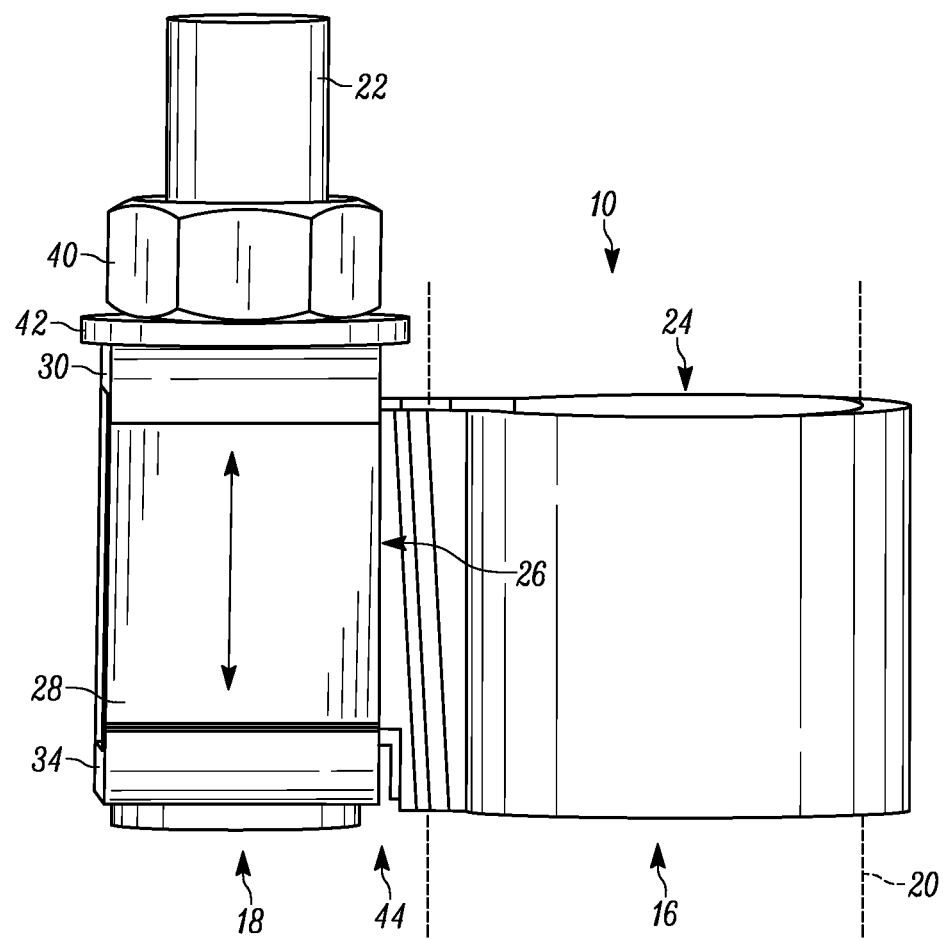
FIG. 1 is a schematic illustration of a side view of a battery clamp assembly of the present invention where the clamping force is applied from the bottom upwards.

The following description is merely exemplary in nature and is in no way intended to limit the disclosure, its application, or uses. For purposes of clarity, the same reference numbers will be used in the drawings to identify similar elements. FIG. 1 illustrates a battery clamp assembly 10, 110 for use with a 12V vehicle battery 12 (not shown), as explained in further detail below. The battery clamp assembly 10, 110 includes a battery sensor 14 which is secured or integrated to a surround portion 16, 116 of the battery clamp assembly 10, 110. The battery sensor 14 may be an intelligent battery sensor (IBS), a simple current sensor, or other type of sensor for use with the vehicle battery 12. A tab that may lead to an IBS bus bar (not shown). The type of attachment for the tab and IBS bus bar may vary according to the vehicle and IBS module. One skilled in the art would be able to select an arrangement for securing the sensor 14 to the clamp assembly 10, 110, which is best for a particular configuration on the vehicle battery 12, the battery sensor and the clamp assembly 10, 110.

The battery clamp assembly 10, 110 is a stamped clamp assembly that includes the surround portion 16, 116 and a securing portion 18, 118. The securing portion 18, 118 is used to tighten the fit of the surround portion 16, 116 about a battery post 20 (not shown). The battery post 20 may be the negative post for the vehicle battery 12.

The securing portion 18, 118 includes a fastener 22, 122 that is accessible from the top of the battery clamp assembly 10, 110 to tighten the clamping force of the battery clamp assembly 10, 110 on the battery post 20. Access to the tightening fastener 22, 122 from the top of the battery clamp assembly 10, 110 allows one battery clamp assembly 10, 110 design to be compatible with all customer packaging requirements.

The battery clamp assembly 10, 110 provides functionality of the clamp, flat layout for least amount of waste, and ease/feasibility of stamping process for repeatable good quality.

Figure 2:
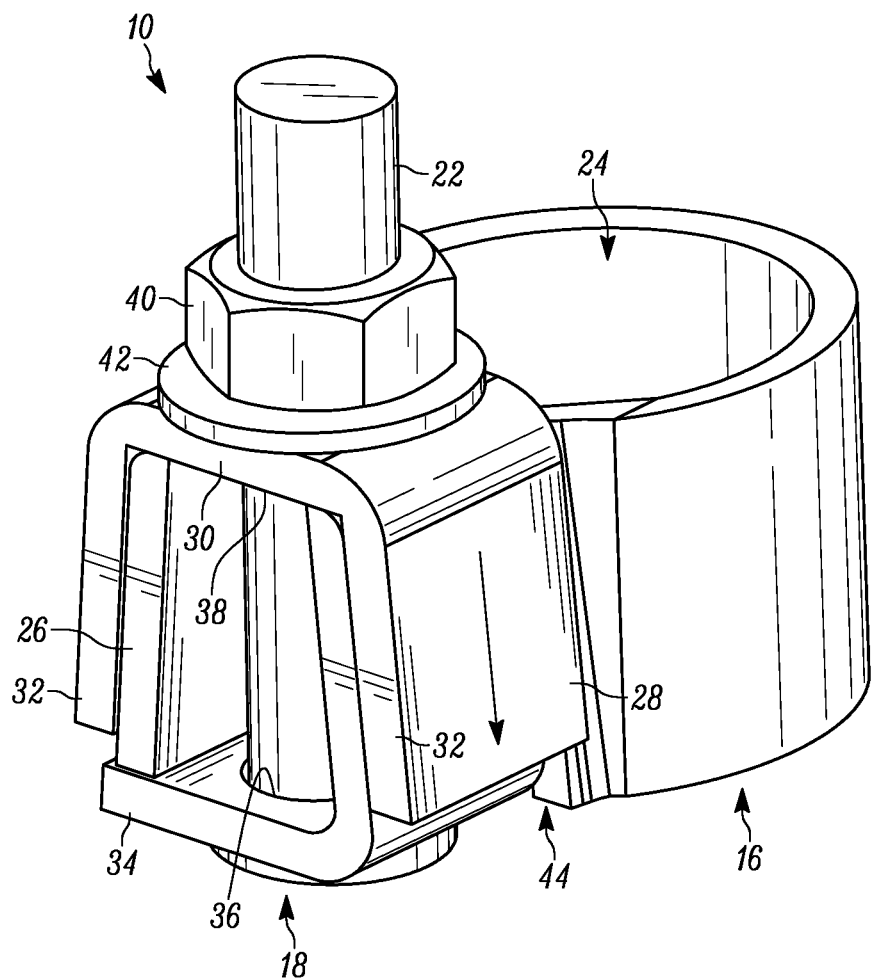
FIG. 2 is a schematic illustration of a perspective view of the battery clamp assembly of FIG. 1 where the clamping force is applied from the bottom upwards.

Referring to FIGS. 1 and 2 a first embodiment of a battery clamp assembly 10 for the present invention is described in greater detail. The battery clamp assembly 10 includes a surround portion 16 and a securing portion 18. The surround portion 16 generally defines a aperture 24 through which the battery post 20 may pass as the battery clamp assembly 10 is assembled on the battery post 20. The surround portion 16 is shaped to at least partially surround the battery post 20. Clamping arms 26 extend from opposing ends of the surround portion 16. When force is applied to the clamping arms 26 to bias the clamping arms towards one another this decreases the diameter of the aperture 24 which is defined by the surround portion 16. That is, a general diameter of the surround portion 16 is decreased. The decreased in size of the surround portion 16 due to the force on the arms 16 applies a clamping force on the battery post 20 with the surround portion 16. Thus, the battery clamp assembly 10 is secured to the battery post 20.

A wedge 28 is fitted over the clamp arms 26. The wedge 28 has a generally U-shaped cross-section, where the base 30 of the U-shape has a smaller width then the distal ends 32 of the U-shape. As the wedge 28 is forced in a downward direction the decreasing cross-section width of the wedge 28 forces the clamp arms 26 to move towards one another. Thus, applying the clamping force from the surround portion 16 on the battery post 20.

The fastener 22 is used to force the wedge 28 to move downwards over the clamp arms 26, as described in further detail herein. A tab 34 may extend from one of the clamp arms 26 toward the other of the clamp arms 26 on a generally downward side of the clamp arms 26. The tab 34 may define a through hole 36 through which the fastener 22 may be assembled. A similar through hole 38 may be defined by the base 30 of the wedge 28. The through hole 36 and the through hole 38 may be opposing arranged from one another such that the fastener 22 may extend through the holes 36, 38 from the bottom on the battery clamp assembly 10 to the top of the battery clamp assembly 10. Once assembled the fastener 22 has a generally parallel orientation with the battery post 20. In most instances, the battery post 20 is vertically aligned within the vehicle and the fastener 22 will also have a generally vertical alignment.

The fastener 22 may be fixed from rotation relative to the base 30 and/or the tab 34. Rotation of the fastener 22 may be fixed using splines, swagining, welding, mechanical interference, etc. The surround portion 16 and the clamp arms 26 may be made from copper material, whereas the wedge may be made from steel. In such instances, securing of the fastener 22, at the head, to the based 30 and/or tab 34 may be best accomplished with mechanical interference.

A nut 40 is threaded on to the end of the fastener 22. A washer 42 may be located between the wedge base 30 and the nut 40 to evenly distribute force on the wedge base 30 form the nut 40. As the nut 40 is threaded further down the fastener 22 the wedge 28 is forced downward over the clamp arms 26 and the battery clamp assembly is tightened. Since, the fastener 22 is fixed from rotation relative to the base 30 and/or tab 34 only one tool, and access from one side of the clamp assembly 10 is needed to apply a tightening torque to the nut 40.

The end of the fastener 22 may also be deformed, e.g. staked, after assembly of the fastener through the holes 36 and 38 and after the nut 40 (and washer 42 if present) have been threaded on the fastener 22. Deformation of the fastener end may keep the clamps arms 26 (and surround portion 16), wedge 28, fastener 22, nut 40 and washer 32 together during transport of the part. The nut 40 should not be tightened over the threads of the fastener 22 until after the surround portion 16 has been placed on the battery pole 20.

In one embodiment, a step 44 may be defined between the bottom of the clamp arms 26 and the bottom of the surrounding portion 16. The step may be used to accommodate the head of the fastener 22. Once assembled and tightened in position the head of the fastener 22 may be generally co-planer with the end of the surround portion 16.

Figure 3:
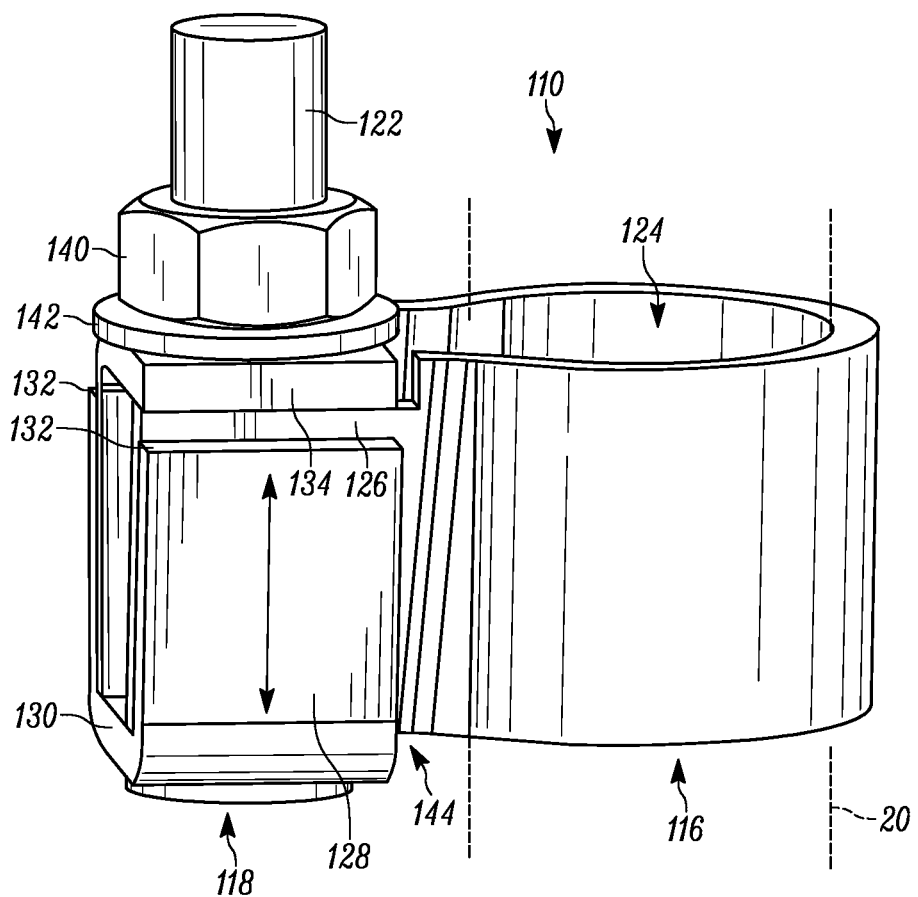
FIG. 3 is a schematic illustration of a side view of another embodiment of a battery clamp assembly of the present invention where the clamping force is applied from the top downwards upwards.
Figure 4:
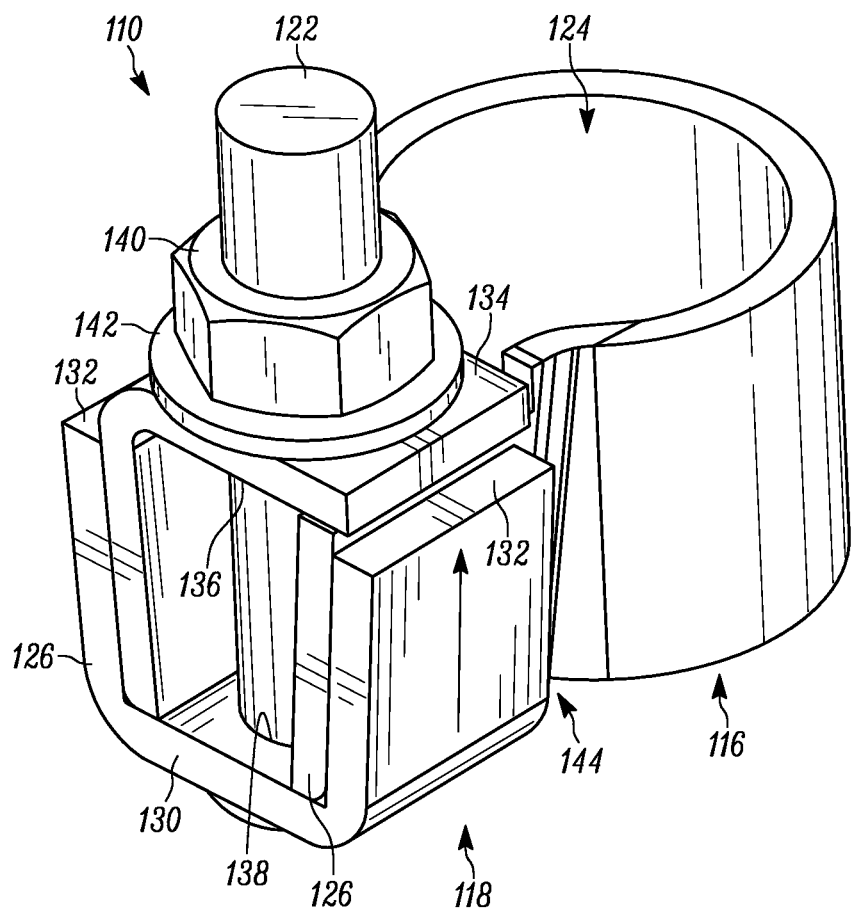
FIG. 4 is a schematic illustration of a perspective view of the battery clamp assembly of FIG. 3 where the clamping force is applied from the top downwards.

Referring to FIGS. 3 and 4 a second embodiment of a battery clamp assembly 110 for the present invention is described in greater detail. The battery clamp assembly 110 includes a surround portion 116 and a securing portion 118. The surround portion 116 generally defines an aperture 124 through which the battery post 120 may pass as the battery clamp assembly 110 is assembled on the battery post 120. The surround portion 116 is shaped to at least partially surround the battery post 20. Clamping arms 126 extend from opposing ends of the surround portion 116. When force is applied to the clamping arms 126 to bias the clamping arms 126 towards one another this decreases the diameter of the aperture 124 which is defined by the surround portion 116. That is, a general diameter of the surround portion 116 is decreased. The decreased in size of the surround portion 116 due to the force on the arms 116 applies a clamping force on the battery post 20 with the surround portion 116. Thus, the battery clamp assembly 110 is secured to the battery post 20.

A wedge 128 is fitted over the clamp arms 126. The wedge 128 has a generally U-shaped cross-section, where the base 130 of the U-shape has a smaller width then the distal ends 132 of the U-shape. As the wedge 128 is forced in an upward direction the decreasing cross-sectional width of the wedge 128 forces the clamp arms 126 to move towards one another. Thus, applying the clamping force from the surround portion 116 on the battery post 20.

The fastener 122 is used to force the wedge 128 to move upwards over the clamp arms 126, as described in further detail herein. A tab 134 may extend from one of the clamp arms 126 toward the other of the clamp arms 126 on a generally upward side of the clamp arms 126. The tab 134 may define a through hole 136 through which the fastener 122 may be assembled. A similar through hole 138 may be defined by the base 130 of the wedge 128. The through hole 136 and the through hole 138 may be opposing arranged from one another such that the fastener 122 may extend through the holes 136, 138 from the bottom of the battery clamp assembly 110 to the top of the battery clamp assembly 110. Once assembled the fastener 122 has a generally parallel orientation with the battery post 20. In most instances, the battery post 120 is vertically aligned within the vehicle and the fastener 122 will also have a generally vertical alignment.

The fastener 122 may be fixed from rotation relative to the base 130 and/or the tab 134. Rotation of the fastener 122 may be fixed using splines, swagining, welding, mechanical interference, etc. The surround portion 116 and the clamp arms 126 may be made from copper material, whereas the wedge may be made from steel. In such instances, securing of the fastener 122, at the head, to the based 130 and/or tab 134 may be best accomplished with mechanical interference.

A nut 140 is threaded on to the end of the fastener 122. A washer 142 may be located between the wedge base 130 and the nut 140 to evenly distribute force on the wedge base 130 form the nut 140. As the nut 140 is threaded further on the fastener 122 the wedge 128 is forced upward over the clamp arms 126 and the battery clamp assembly 110 is tightened. Since, the fastener 122 is fixed from rotation relative to the base 130 and/or tab 134 only one tool, and access from one side of the clamp assembly 110 is needed to apply a tightening torque to the nut 140.

The end of the fastener 122 may also be deformed, e.g. staked, after assembly of the fastener through the holes 136 and 138 and after the nut 140 (and washer 142 if present) have been threaded on the fastener 122. Deformation of the fastener end may keep the clamps arms 126 (and surround portion 116), wedge 128, fastener 122, nut 140 and washer 142 together during transport of the clamp assembly 110. The nut 140 should not be tightened on the threads of the fastener 122 until after the surround portion 116 has been placed on the battery pole 120.

In one embodiment, a step 14 may be defined between the bottom of the clamp arms 126 and the bottom of the surrounding portion 116. The step may be used to accommodate the head of the fattener 1223. Once assembled and tightened in position the head of the fastener 122 may be generally co-planer with the end of the surround portion 116.

Referring to FIGS. 1-4, a method for assembling a battery sensor clamp 10, 110 comprises providing a surround portion 16, 116 having a pair of clamping arms 26, 126 extending in generally the same direction as one another from opposing ends of the surround portion 16, 116 and a tab 34,134 extending from one of the clamp arms 26, 126 toward the other of the clamp arms 26, 126. The tab 34, 134 defines a first through hole 36, 136 and a fastener 22, 122 is threaded through the first through hole 36, 136. A wedge 28, 128 having a generally U-shaped cross-section is fitted over the clamp arms 26, 126, wherein a width of the base 30, 130 of the wedge 28, 128 is less than a width at distal ends 32, 132 of the U-shaped cross-section. The base 30, 130 of the wedge 28, 128 defines a second through hole 38, 138 and the fastener 22, 122 is threaded through the second through hole 38, 138. A washer 42, 142 is assembled on the fastener 22, 122 proximate to the tab or the base of the wedge. A nut 40, 140 is threaded on the fastener 22, 122 to retain the wedge 28, 128 to the clamp arms 26, 126 for shipping and handling of the battery sensor clamp assembly 10, 110 prior to assembly on the battery pole 20. The fastener 22, 122 may be secured to the base 30, 130 or tab 34, 134 at this same time.

The surround portion 16, 116 also defines aperture 24, 124 for at least partially surrounding a battery post 20 for the vehicle battery is placed on the battery post 20 and the nut 40, 140 is tightened on the fastener 22, 122 to force the wedge 28, 128 over the clamp arms 26, 126 such that the width at the base 30, 130 of the wedge 28, 128 forces the clamp arms 26, 126 toward one another and decreases the size of the aperture 24, 124 to apply a clamping force around the battery post 20.

In one embodiment the base 30, 130 of the wedge 28, 128 is assembled on an upward side of the clamp arms 26, 126 and the wedge 28, 128 moves in a downward direction when fastener 22, 122 and nut 40, 140 to tighten the clamp arms 26, 126. This embodiment would include fixing the fastener 22, 122 from rotation relative to the tab 34, 134.

In one embodiment the base 30, 130 of the wedge 28, 128 is assembled on a downward side of the clamp arms 26, 126 and the wedge 28, 128 moves in a upward direction when fastener 22, 122 and nut 40, 140 to tighten the clamp arms 26, 126. This embodiment would include fixing the fastener 22, 122 from rotation relative to the wedge 28, 128.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A clamp assembly for securing a battery sensor to a vehicle battery comprising:
    a surround portion defining an aperture for at least partially surrounding a battery post for the vehicle battery;
    a pair of clamping arms extending from opposing ends of the surround portion and in generally the same direction as one another;
    a tab extending from one of the clamp arms toward the other of the clamp arms, wherein the tab defines a first through hole;
    a wedge having a base and a pair of wings extending from the base to define a generally U-shaped cross-section, wherein a width of the base of the wedge is less than a width at distal ends of the wings, wherein each of the wings defines a plane generally parallel to a plane defined by one of the clamping arms, and wherein the base of the wedge defines a second through hole;
    a fastener wherein the wedge is fitted over the clamping arms and the fastener is threaded through the first and the second through holes; and
    a nut threaded on the fastener to force the wedge over the clamp arms such that the width at the base of the wedge forces the clamp arms toward one another.

2. The clamp assembly of claim 1, wherein the base of the wedge is on an upward side of the clamp arms and the fastener moves the wedge in a downward direction to tighten the clamp arms.

3. The clamp assembly of claim 2, wherein the fastener is fixed from rotation relative to the tab.

4. The clamp assembly of claim 1, wherein the fastener is fixed from rotation relative to the base of the wedge.

5. The clamp assembly of claim 1, further comprising a washer assembled between the nut and at least one of the tab and the base of the wedge.

6. The clamp assembly of claim 1, further comprising a step defined by the clamp arms and the surround portion, such that a head of the fastener may be flush with the lower edge of the surround portion.

7. The clamp assembly of claim 1, wherein the clamp arms are generally parallel to one another prior to tightening the nut on the fastener.

8. The clamp assembly of claim 1, wherein the base of the wedge is on a downward side of the clamp arms and the fastener moves the wedge in an upward direction to tighten the clamp arms.

9. A method for assembling a battery sensor clamp comprising:
    providing a surround portion having a pair of clamping arms extending in generally the same direction as one another from opposing ends of the surround portion and a tab extending from one of the clamp arms toward the other of the clamp arms, wherein the tab defines a first through hole;

threading a fastener through the first through hole fitting a wedge having a base and a pair of wings extending from the base to define a generally U-shaped cross-section over the clamp arms, wherein a width of the base of the wedge is less than a width at distal ends of the wings, wherein each of the wings defines a plane generally parallel to a plane defined by one of the clamping arms, and wherein the base of the wedge defines a second through hole;

threading the fastener through the second through hole; and threading a nut on the fastener to retain the wedge to the clamp arms.

10. The method of claim 9 further comprising:

placing the surround portion which defines an aperture for at least partially surrounding a battery post for the vehicle battery is placed on the battery post;

tightening the nut on the fastener to force the wedge over the clamp arms such that the width at the base of the wedge forces the clamp arms toward one another and decreases the size of the aperture to apply a clamping force around the battery post.

11. The method of claim 9 further comprising, assembling the base of the wedge on an upward side of the clamp arms and moving the wedge in a downward direction when fastener and nut to tighten the clamp arms.

12. The method of claim 11, further comprising fixing the fastener from rotation relative to the tab.

13. The method of claim 9 further comprising, assembling the base of the wedge on a downward side of the clamp arms and moving the wedge in a upward direction when fastener and nut to tighten the clamp arms.

14. The method of claim 13, further comprising fixing the fastener from rotation relative to the wedge.

15. The method of claim 9, further comprising disposing a washer between the nut and at least one of the tab and the base of the wedge.

16. A clamp assembly for securing a battery sensor to a vehicle battery comprising:

a surround portion defining an aperture for at least partially surrounding a battery post for the vehicle battery;

a pair of clamping arms extending from opposing ends of the surround portion and in generally the same direction as one another;

a tab extending from one of the clamp arms toward the other of the clamp arms, wherein the tab defines a first through hole;

a wedge having a generally U-shaped cross-section, wherein a width of the base of the wedge is less than a width at distal ends of the U-shaped cross-section, wherein the base of the wedge defines a second through hole;

a fastener wherein the wedge is fitted over the clamping arms and the fastener is threaded through the first and the second through holes;

a nut threaded on the fastener to force the wedge over the clamp arms such that the width at the base of the wedge forces the clamp arms toward one another; and a step defined by the clamp arms and the surround portion, such that a head of the fastener may be flush with the lower edge of the surround portion.

* * * * *